(12) United States Patent
Yadav et al.

(10) Patent No.: US 10,742,533 B2
(45) Date of Patent: Aug. 11, 2020

(54) BUILT-IN TEST TRAFFIC GENERATOR

(71) Applicant: Juniper Networks, Inc., Sunnyvale, CA (US)

(72) Inventors: Alam Yadav, Sunnyvale, CA (US); Karthikeyan Veerabadran, Alviso, CA (US); Eswaran Srinivasan, Fremont, CA (US); Manjunath Mandigatta Navilappa, Sunnyvale, CA (US); Balaji Mohan, Sunnyvale, CA (US); Raghuraman Thirumalairajan, Pleasanton, CA (US); Dhairyashil Patil, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/893,304

(22) Filed: Feb. 9, 2018

(65) Prior Publication Data
US 2019/0253335 A1    Aug. 15, 2019

(51) Int. Cl.
*H04L 12/26*    (2006.01)
(52) U.S. Cl.
CPC .............. *H04L 43/10* (2013.01); *H04L 43/50* (2013.01)
(58) Field of Classification Search
None
See application file for complete search history.

(56) References Cited

U.S. PATENT DOCUMENTS

| | | | | |
|---|---|---|---|---|
| 5,313,453 A | * | 5/1994 | Uchida | H04L 1/0083 370/248 |
| 2003/0172177 A1 | * | 9/2003 | Kersley | H04L 43/50 709/236 |
| 2003/0179777 A1 | * | 9/2003 | Denton | H04L 43/50 370/503 |
| 2013/0124911 A1 | * | 5/2013 | Griffith | H04L 45/28 714/4.2 |
| 2013/0166960 A1 | | 6/2013 | Das et al. | |
| 2013/0305091 A1 | | 11/2013 | Stan et al. | |
| 2014/0016479 A1 | * | 1/2014 | Coomber | H04L 12/413 370/241.1 |

FOREIGN PATENT DOCUMENTS

| | | | |
|---|---|---|---|
| WO | 03013066 A2 | 2/2003 | |
| WO | WO-2012125160 A1 * | 9/2012 | H04L 43/0882 |

OTHER PUBLICATIONS

Extended European Search Report for Application No. EP18209469.8, dated Mar. 22, 2019, 8 pages.

* cited by examiner

*Primary Examiner* — Robert M Morlan
(74) *Attorney, Agent, or Firm* — Harrity & Harrity, LLP

(57) ABSTRACT

A network device may include a packet generator device implemented in hardware. The packet generator device may include a control component, a payload generation component, and an interface element to receive test packet generation information. The test packet generation information may include one or more control inputs, header data that is to be included in one or more test packets, and information regarding a data pattern that is to be included in payload data of the one or more test packets. The one or more control inputs, when provided to the control component, may cause the control component to control the payload generation component to generate the one or more test packets based on the header data and the information regarding the data pattern.

20 Claims, 10 Drawing Sheets

BUILT-IN TEST TRAFFIC GENERATOR

BACKGROUND

A network device receives and forwards traffic (e.g., packets) to one or more devices (e.g., client device(s), other network device(s), and/or the like) over a network. External test equipment is often used to test the operation of network devices.

SUMMARY

According to some possible implementations, a network device may include a packet generator device implemented in hardware. The packet generator device may include a control component, a payload generation component, and an interface element to receive test packet generation information. The test packet generation information may include one or more control inputs, header data that is to be included in one or more test packets, and information regarding a data pattern that is to be included in payload data of the one or more test packets. The one or more control inputs, when provided to the control component, may cause the control component to control the payload generation component to generate the one or more test packets based on the header data and the information regarding the data pattern.

According to some possible implementations, a packet processing device may include a packet generator device implemented at least partially in hardware. The packet generator device may include a control component, a payload generation component, and an interface element to receive packet generation information. The packet generation information may include one or more control inputs, header data, and information regarding a data pattern. The one or more control inputs, when provided to the control component, may cause the control component to control the payload generation component to generate a plurality of test packets based on the header data and/or the information regarding the data pattern.

According to some possible implementations, a method may include receiving, by an interface element of a packet generator device, test packet generation information. The packet generator device may be incorporated in a packet forwarding component of a network device, and may include a control component and a payload generation component. The test packet generation information may include one or more control inputs, header data, and information regarding a data pattern. The method may include obtaining, by the control component and from the interface element, the one or more control inputs, and causing, by the control component and based on the one or more control inputs, the payload generation component to generate a plurality of test packets based on the header data or the information regarding the data pattern.

DETAILED DESCRIPTION

Figure 1A:
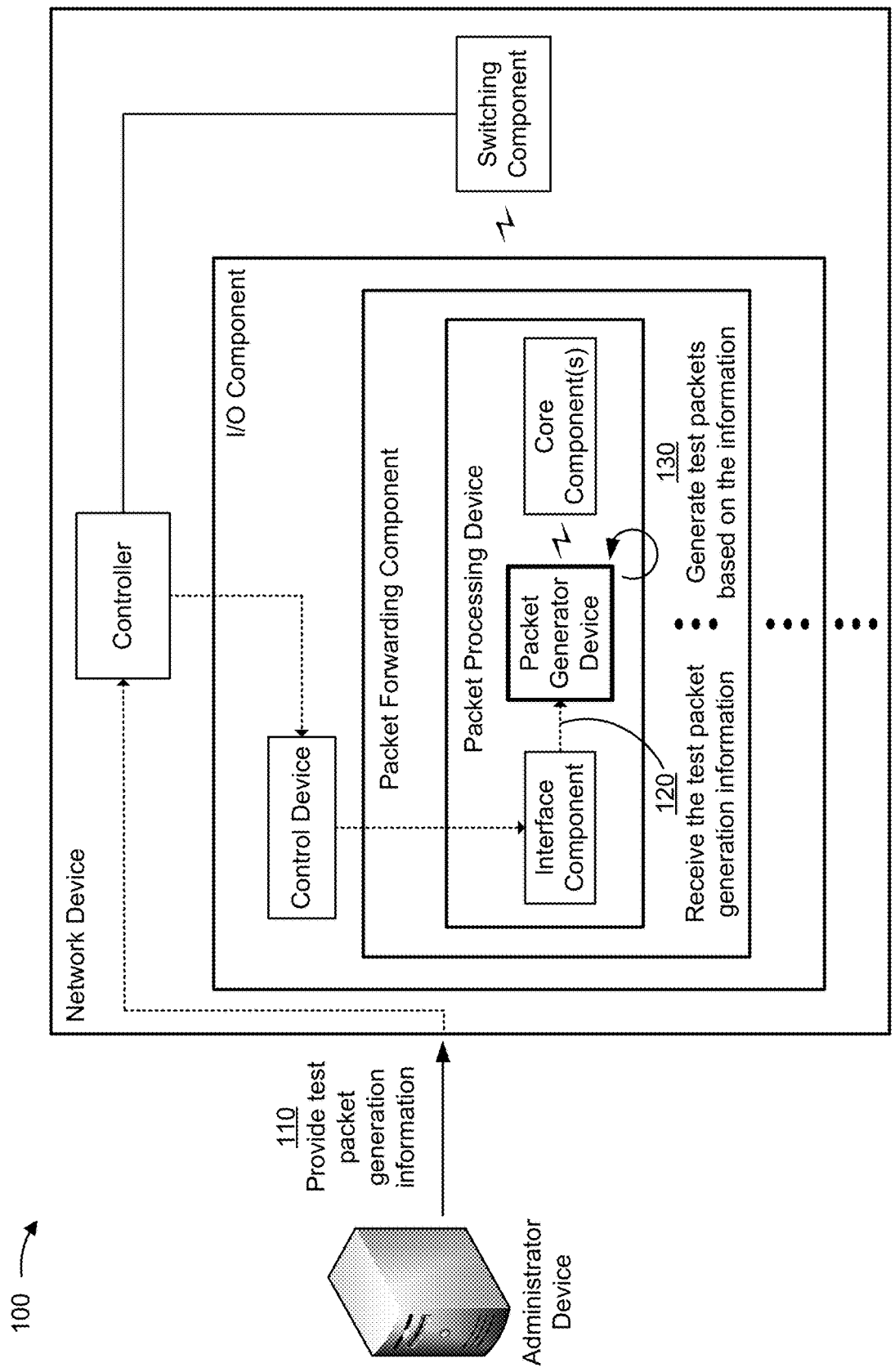
FIGS. 1A and 1B are diagrams of an overview of an example implementation described herein.

The following detailed description of example implementations refers to the accompanying drawings. The same reference numbers in different drawings may identify the same or similar elements.

Faster and more advanced networking technologies are constantly being developed. This continually increases port speeds and the number of supported ports in network devices, such as routers, switches, firewalls, and/or the like. For example, following recent developments in optical fiber technology, many network device components (e.g., line cards) now include multiple types of optical fiber interfaces that are all supported in a common form factor. In many cases, a network device or system (e.g., one or more packet processing and/or forwarding components of the network device or system) may need to be tested, which may involve the use of different external test equipment (e.g., traffic generators) to generate test traffic (e.g., test packets) at various line rates supported by the network device or system. However, such external test equipment may be expensive to develop and procure, may be difficult to operate, may require network interruption when operating, or the like.

Some implementations, described herein, provide a device (e.g., a packet generator device) that is incorporated in a packet forwarding component of an input and/or output component for a network device, such as a router, a switch, and/or the like (e.g., built into an application-specific integrated circuit (ASIC) of a packet forwarding component that may be coupled to (e.g., installed in) a line card), and that is capable of generating test packets for testing (e.g., at different line rates and up to the full capacity and/or bandwidth of) the packet forwarding component, one or more other packet forwarding components that may be coupled to the input and/or output component (e.g., other packet forwarding component(s) of the same line card), one or more packet forwarding components that may be coupled to one or more other input and/or output components (e.g., packet forwarding component(s) of other line card(s)), and/or one or more other components (e.g., one or more switching components (e.g., fabric interconnect(s)) of the network device. In some implementations, the device is capable of generating test packets based on test packet generation information provided from a user interface (e.g., a command line interface) communicatively coupled to the device.

In this way, an input and/or output component (e.g., a line card) and/or a packet processing and/or forwarding component coupled to the input and/or output component is self-equipped with a packet generator device that generates test packets, which reduces or eliminates a need for external test equipment for network device testing purposes, thereby reducing the costs associated with testing a network device and/or components of the network device. In addition, this permits customization of test packets (e.g., by including or injecting intentional errors in the test packets), which permits the design of unit test cases to test and/or diagnose error handling in software (e.g., various software functions, such as functions typically tested during smoke tests (e.g., functionality tests)) and hardware components (e.g., ASICs, etc.) during system development, device manufacturing, and in-field debugging, which speeds up development and manufacturing cycles and debug sessions. Furthermore, the capability to customize test packets permits testing of various (e.g., all) media types supported by a network device (e.g., 1-gigabit (Gbit) Ethernet, 10-Gbit Ethernet, 40-Gbit Ethernet, 100-Gbit Ethernet, 200-Gbit Ethernet, 400-Gbit Ethernet, etc.), which reduces or eliminates a need to develop and/or procure new test equipment, as newer networking technologies are incorporated into network device components, such as line cards and packet forwarding components.

Figure 1B:
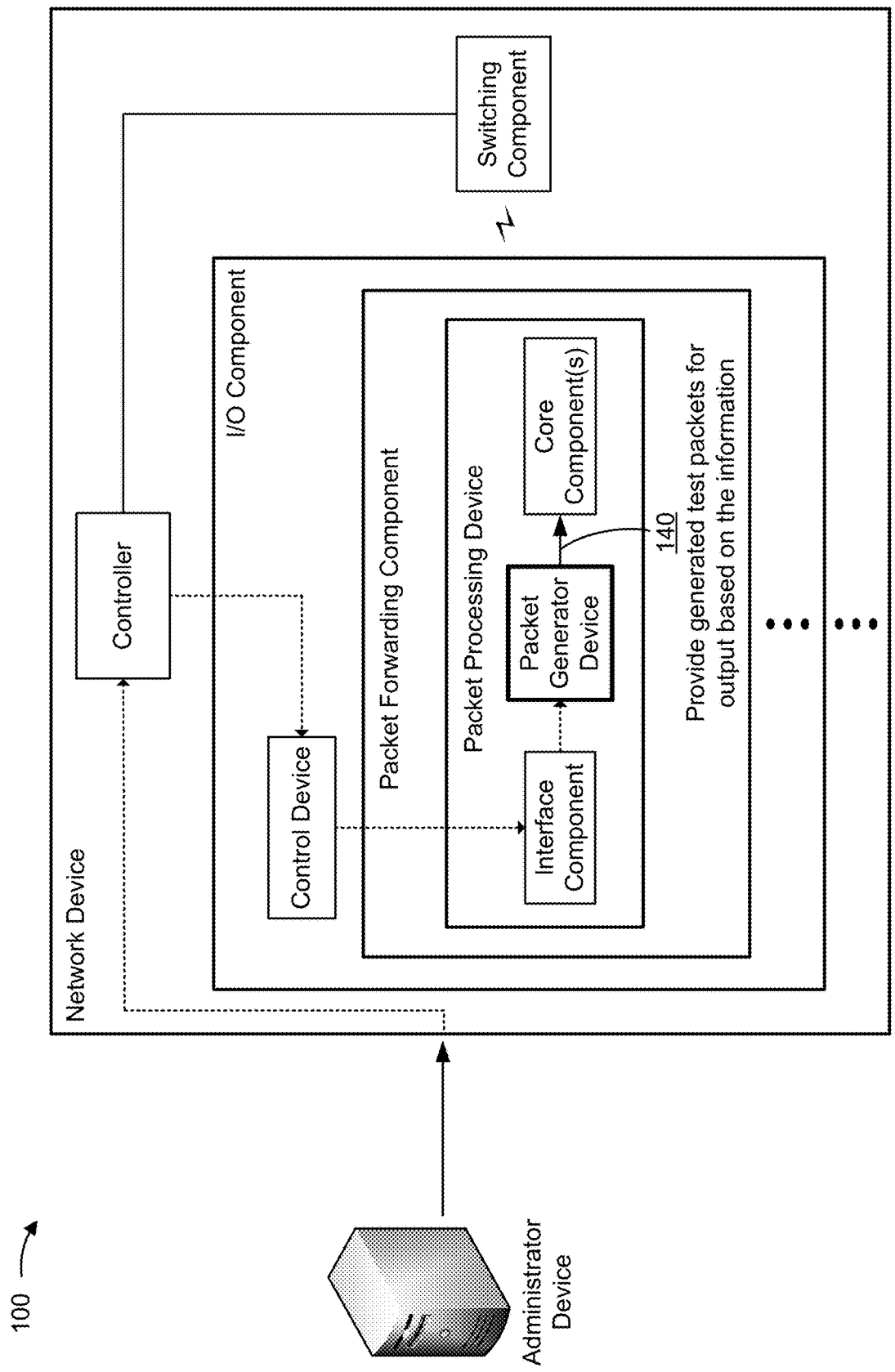

FIGS. 1A and 1B are diagrams of an overview of an example implementation 100 described herein. As shown in FIGS. 1A and 1B, example implementation 100 may include an administrator device (e.g., a computing and/or a communication device), and a network device (e.g., a router, a switch, a firewall, and/or the like) that includes a controller, a switching component, and an input and/or output (I/O) component (e.g., a line card). As shown, the I/O component may include a control device, and a packet forwarding component that includes a packet processing device.

In some implementations, the control device may include one or more processors (e.g., implemented as one or more ASICs). In some implementations, the packet processing device may be implemented as an ASIC that can process and/or forward packets received by the network device. As shown, the packet processing device may include core component(s) (e.g., one or more processors (e.g., packet processor(s)), one or more memories, and/or the like), an interface component (e.g., a programmable input/output component) communicatively coupled to the control device, and a packet generator device that can generate test packets.

In some implementations, the packet generator device may be implemented in hardware (e.g., including one or more logic circuits and/or components), firmware, or a combination of hardware and software.

As used herein, a packet may refer to a communication structure for communicating information, such as a protocol data unit (PDU), a network packet, a frame, a subframe, a datagram, a segment, a message, a block, a cell, a slot, a symbol, a portion of any of the above, and/or another type of formatted or unformatted unit of data capable of being transmitted via a network.

Although not shown, in some implementations, the control device of the I/O component may include one or more drivers, and an application module (e.g., an embedded software module) that can utilize the driver(s) to control the packet processing device. In some implementations, the driver(s) may communicate with the packet processing device via a bus (e.g., via a high speed serial-based bus, such as a peripheral component interconnect express (PCIe) bus). Although not shown, in some implementations, the controller of the network device may include a packet generator element (e.g., a software-based tool or toolkit) that can communicate with the application module (e.g., via one or more application function calls), of the control device of the I/O component, to control the driver(s).

In some implementations, the administrator device may provide a user interface (e.g., a command line interface) that can permit a user (e.g., a system or network administrator) to input command(s) to manage (e.g., configure, monitor, and/or the like) the network device. In some implementations, the administrator device (e.g., the user interface of the administrator device) may be communicatively coupled to the packet generator element via the controller of the network device (e.g., via an operating system executed by the controller). In some implementations, the administrator device may provide a user interface, such as a command line interface, that permits a user (e.g., a network or system administrator) to input the test packet generation information.

As shown in FIG. 1A, and as shown by reference number 110, the administrator device may provide test packet generation information to the controller of the network device. In a case where the controller includes a packet generator element, and the control device includes an application module and driver(s) (e.g., as described above), the controller may provide the test packet generation information to the packet generator element, which may, in turn, cause the application module to control the drivers to provide the test packet generation information to the interface component of the packet processing device. As shown by reference number 120, the packet generator device may receive the test packet generation information from the interface component.

In some implementations, the test packet generation information may include one or more parameters relating to the test packets that are to be generated. For example, the test packet generation information may include information regarding a quantity of test packets that are to be generated, information regarding a rate at which the test packets are to be generated and/or provided (e.g., an output rate), header data (e.g., ingress/egress port and/or address identifier(s), including, for example, layer 2 header data, such as Ethernet header data (e.g., media access control (MAC) address information, etc.) and/or layer 3 header data, such as Internet Protocol (IP) header data (e.g., IP address information, time to live (TTL) information, etc.)) that is to be included in a header portion of each test packet, information regarding one or more data patterns that are to be included in payload data of each test packet (e.g., information indicating that the payload data is to be random, information indicating that the payload data is to include all 1's or all 0's, or information indicating that the payload data is to include one or more other data patterns), information regarding a size (e.g., a quantity of bits, bytes, and/or the like, which may be selectable in increments or steps) at which each test packet is to be generated, including, for example, a minimum and/or a maximum size of each test packet that is to be generated, information regarding a type of service (TOS) relating to each test packet, and/or the like.

In some implementations, and as an example, the capability to configure (e.g., by a user) a size of each test packet and/or a payload data pattern to be included in each test packet may permit the diagnosis and/or correction of certain device or system errors, such as memory-related errors.

As shown in FIG. 1A, and as shown by reference number 130, the packet generator device may generate test packets based on the test packet generation information. For example, in a case where the test packet generation information includes header data, the packet generator device may include the header data in a header portion of each test packet. Additionally, or alternatively, and continuing the example, in a case where the test packet generation information includes information regarding one or more data patterns to be included in payload data of each test packet, the packet generator device may generate and/or include payload data, in each test packet, based on the information regarding the one or more data patterns. Additionally, or alternatively, and further continuing the example, in a case where the test packet generation information includes information regarding a quantity of test packets that are to be generated, the packet generator device may generate the test packets based on the quantity of test packets that is to be generated (e.g., the packet generator device may generate a quantity of test packets that is equal to, slightly less than, or slightly greater than, the quantity of test packets that is to be generated).

As shown in FIG. 1B, and as shown by reference number 140, the packet generator device may provide the generated test packets to the core component(s) of the packet processing device for output based on the test packet generation information. In some implementations, and in a case where the test packet generation information includes information regarding a rate at which the generated test packets are to be provided (e.g., an output rate), the packet generator device may provide the test packets at that rate.

In some implementations, in a case where the test packet generation information includes header data, and where such header data includes a destination address (e.g., a destination Ethernet MAC address and/or a destination IP address) that corresponds to a device (e.g., a client device) that is communicatively coupled to a physical/link layer device (e.g., an Ethernet MAC/physical coding sublayer (PCS) device) of the packet processing device, the core component(s) of the packet processing device may forward the generated test packets to the physical/link layer device.

Alternatively, in a case where the test packet generation information includes header data, and where such header data includes a destination address (e.g., a destination Ethernet MAC address and/or a destination IP address) that corresponds to a device (e.g., a client device) that is not communicatively coupled to a physical/link layer device of the packet processing device, the core component(s) of the packet processing device may forward the generated test packets to the switching component of the network device for subsequent forwarding based on the destination address (e.g., to another packet forwarding component of the same I/O component, to another packet forwarding component of another I/O component of the network device, to a device (e.g., a client device, a server device, another network device, and/or the like) over a network to which the network device is communicatively coupled, and/or the like).

In some implementations, there may be no restrictions as to the destination of traffic to be generated. For example, there may be no restrictions as to a destination MAC address that can be included in the header data and/or a destination IP address that can be included in the header data.

In this way, an I/O component (e.g., a line card) and/or a packet processing and/or forwarding component coupled to the I/O component is self-equipped with a packet generator device that generates test packets, which reduces or eliminates a need for external test equipment for network device testing purposes, thereby reducing the costs associated with testing a network device and/or components of the network device.

Figure 7A:
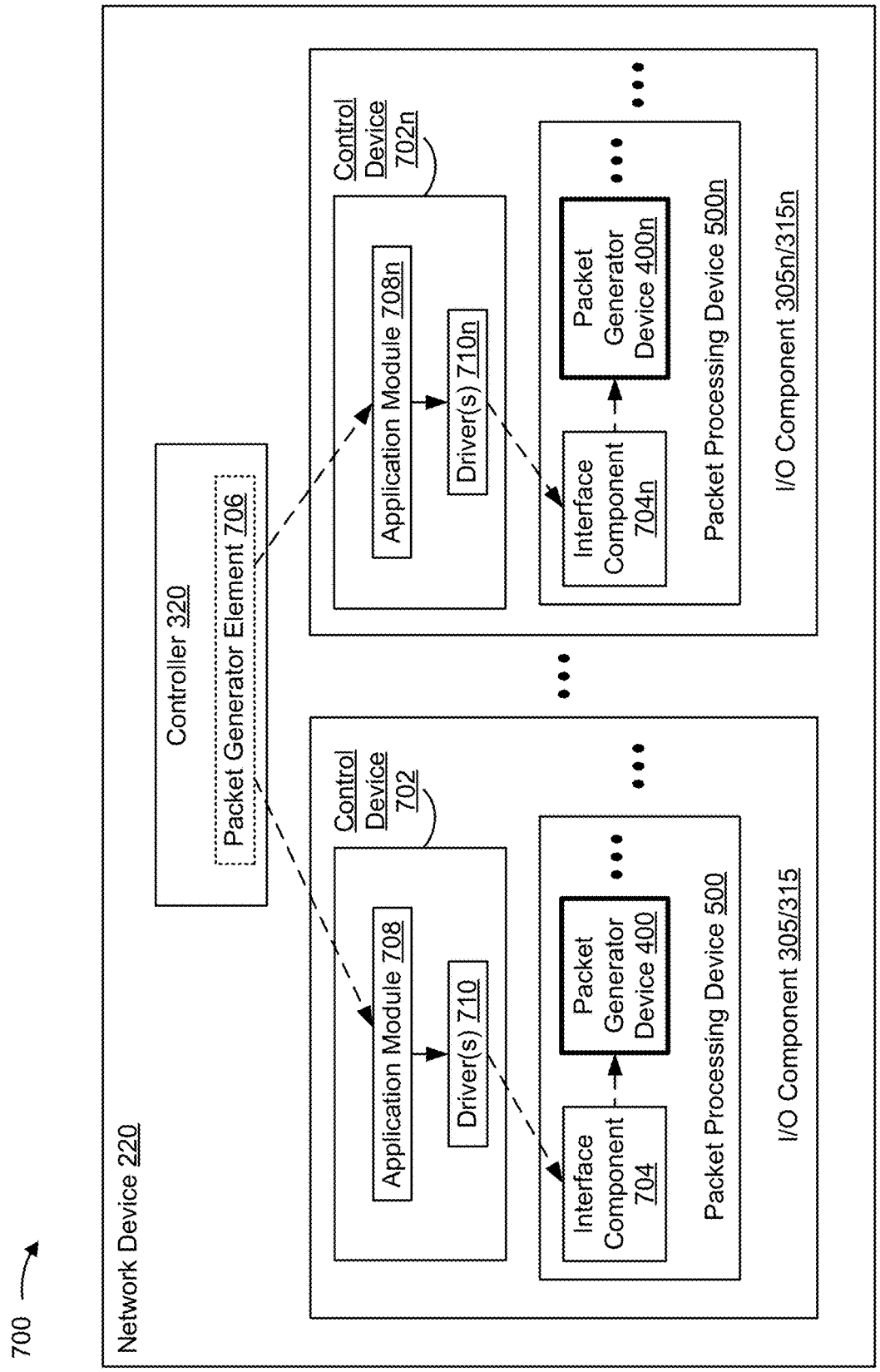
FIGS. 7A-7C are diagrams of example implementations relating to the packet generator device of FIG. 4 and the packet processing device of FIG. 5.
Figure 7B:
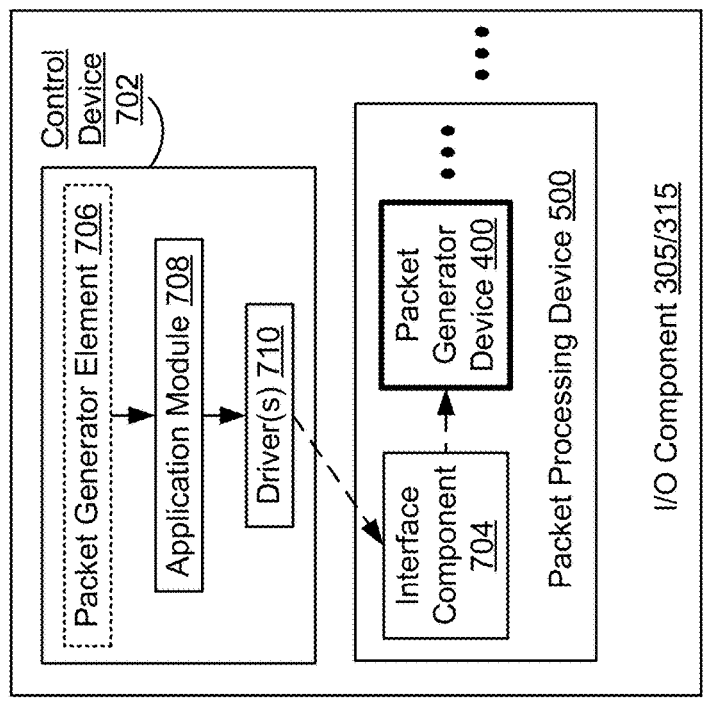
Figure 7C:
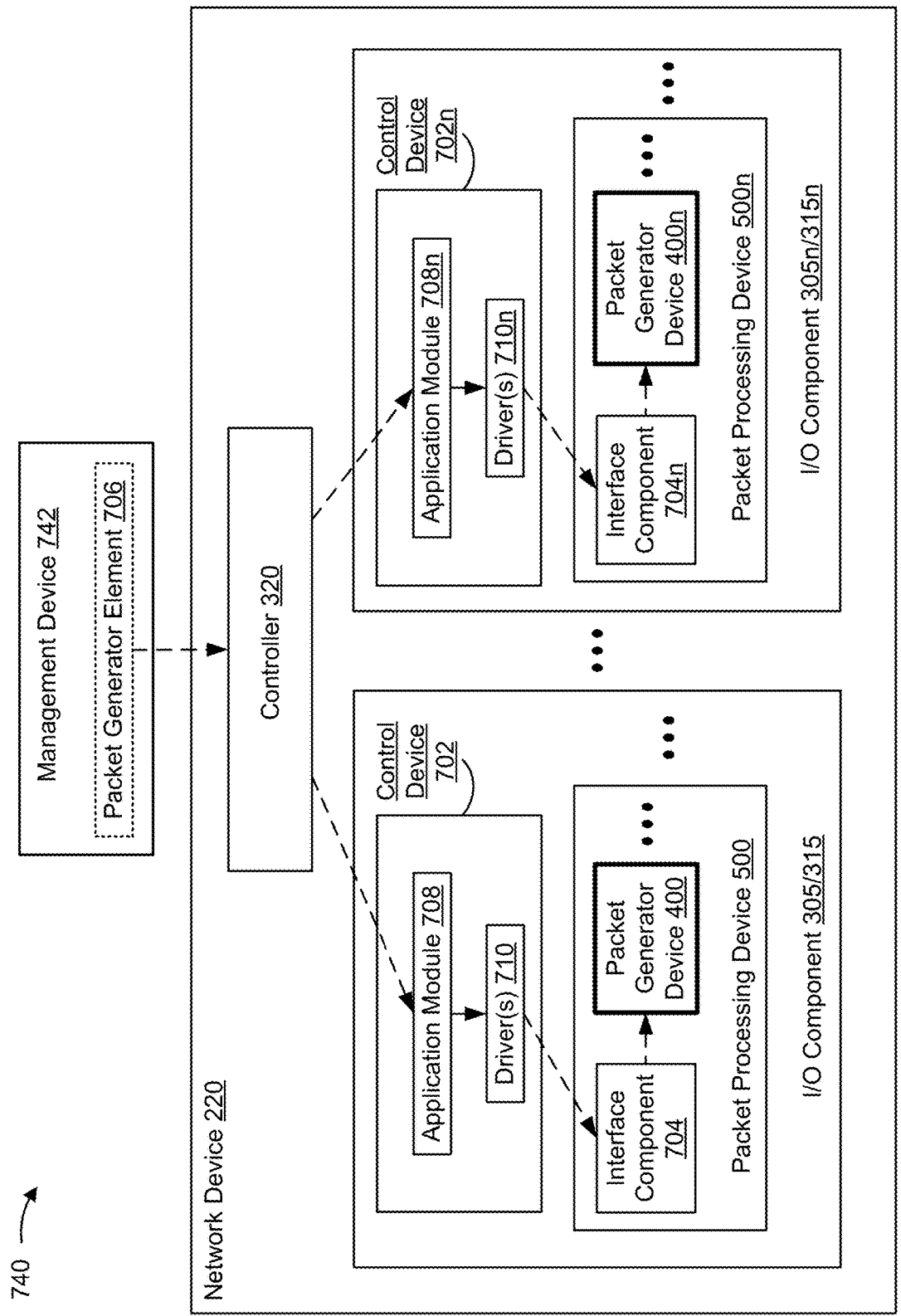

Some implementations were described with respect to a packet generator element (e.g., a software-based tool or toolkit) that may be included in the controller of a network device. In some implementations, the packet generator element may be included in another component or device, such as, for example, a control device of an I/O component (e.g., a processor of a line card) and/or an external device (e.g., a management device) located remotely from the network device. Examples of the various implementations are shown in FIGS. 7A-7C, and described in more detail below.

As indicated above, FIGS. 1A and 1B are provided merely as an example. Other examples are possible and may differ from what was described with regard to FIGS. 1A and 1B.

Figure 2:
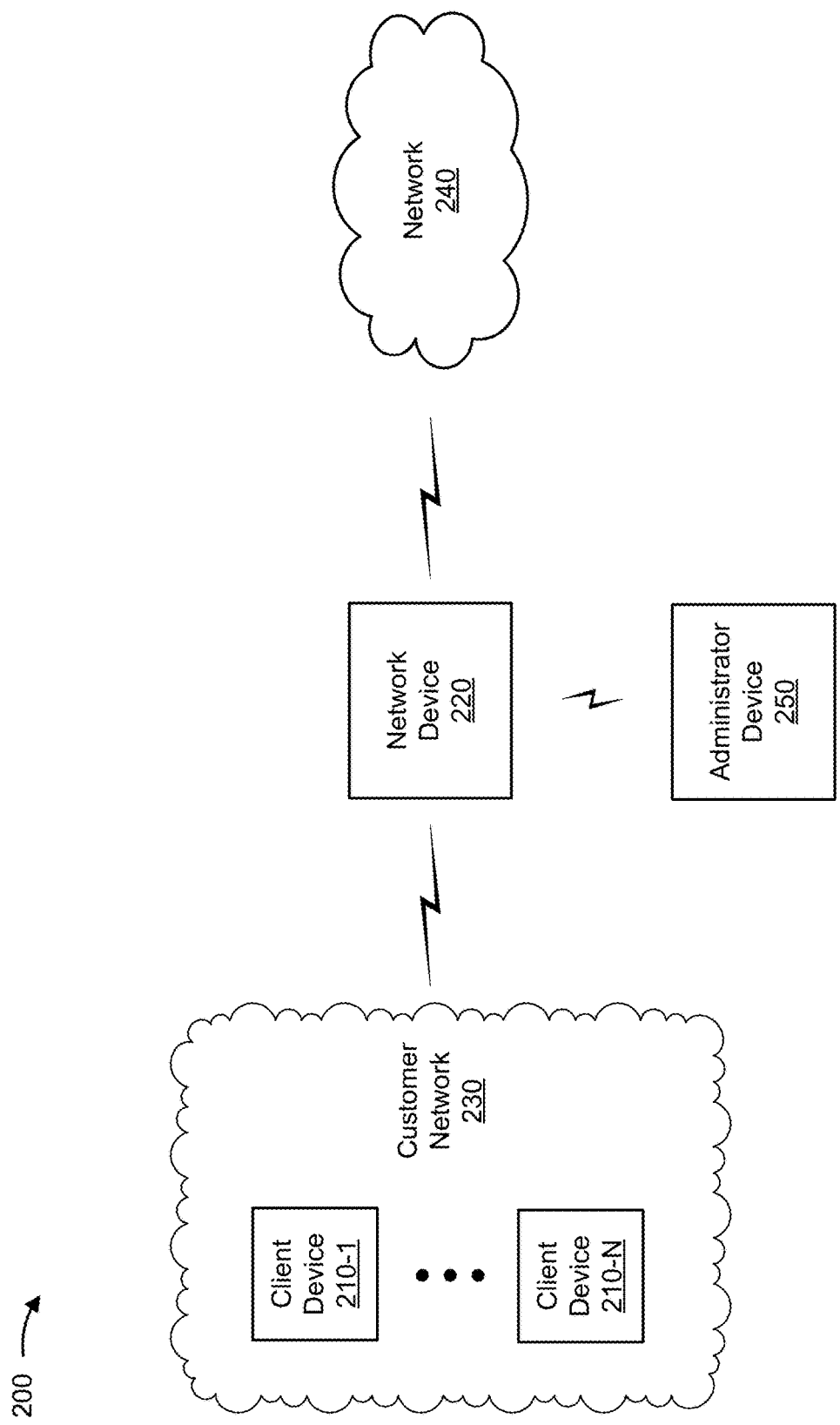
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as "client devices 210," and individually as "client device 210"), a network device 220, a customer network 230, a network 240, and an administrator device 250. Devices of environment 200 may interconnect via wired connections, wireless connections, or a combination of wired and wireless connections.

Client device 210 includes one or more devices capable of receiving, generating, storing, processing, and/or providing information. For example, client device 210 may include a communication and/or computing device, such as a desktop computer, a laptop computer, a tablet computer, a server device (e.g., in a data center or in a cloud computing environment), a mobile phone (e.g., a smart phone or a radiotelephone), a gaming device, a wearable communication device (e.g., a smart wristwatch, a pair of smart eyeglasses, or a smart activity band), or a similar type of device.

Network device 220 includes one or more devices capable of receiving, storing, generating, processing, and/or transferring traffic (e.g., packets) associated with client device 210, and/or capable of monitoring traffic for client device 210 and/or customer network 230. For example, network device 220 may include a router, a gateway, a switch, a hub, a bridge, a reverse proxy, a server (e.g., a proxy server, a web server, a host server, a storage server, a server in a data center or cloud computing environment, etc.), a firewall, a security device, an intrusion detection device, a load balancer, or a similar type of device. Network device 220 may be used in connection with a single client device 210 or a group of client devices 210 (e.g., client devices 210 associated with a private network, a data center, etc.). In some implementations, communications may be routed through network device 220 to reach the group of client devices 210. Additionally, or alternatively, communications may be routed to network device 220 when the communications are directed toward client device 210. In some implementations, network device 220 may be a physical device implemented within a housing, such as a chassis. In some implementations, network device 220 may be a virtual device implemented by one or more computer devices of a cloud computing environment or a data center. Although FIG. 2 shows a single network device 220, in practice, there may be hundreds, thousands, millions, etc. of network devices 220.

Customer network 230 may include one or more wired and/or wireless networks. For example, customer network 230 may include a local area network (LAN), a private network, an intranet, a cloud computing network, a cellular network (e.g., a long-term evolution (LTE) network, a 3G network, a code division multiple access (CDMA) network, etc.), a public land mobile network (PLMN), a wide area network (WAN), a metropolitan area network (MAN), a telephone network (e.g., the Public Switched Telephone Network (PSTN)), an ad hoc network, the Internet, a fiber optic-based network, and/or the like, and/or a combination of these or other types of networks. In some implementations, customer network 230 may be a private network associated with client devices 210.

Network 240 includes one or more wired and/or wireless networks. For example, network 240 may include a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Administrator device 250 includes one or more devices capable of providing administration services to devices, such as network device 220. For example, administrator device 250 may include a computer, a server, a mobile device (e.g., a smartphone, a tablet computer, etc.), and/or the like. Administrator device 250 may provide one or more user interfaces (e.g., a command line interface) that may permit a user (e.g., a system or network administrator) to configure network device 220, instruct network device 220 to perform one or more actions relating to traffic, and/or query network device 220 for status and/or configuration information. In some implementations, the user interface may permit a user to input test packet generation information that can be used (e.g., by a packet generator device included in a packet forwarding component of network device 220) to generate and provide test packets (e.g., to one or more of client devices 210, to one or more devices, such as network device(s), server device(s), security device(s), and/or client device(s) coupled to network 240, to one or more components of network device 220, and/or the like).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
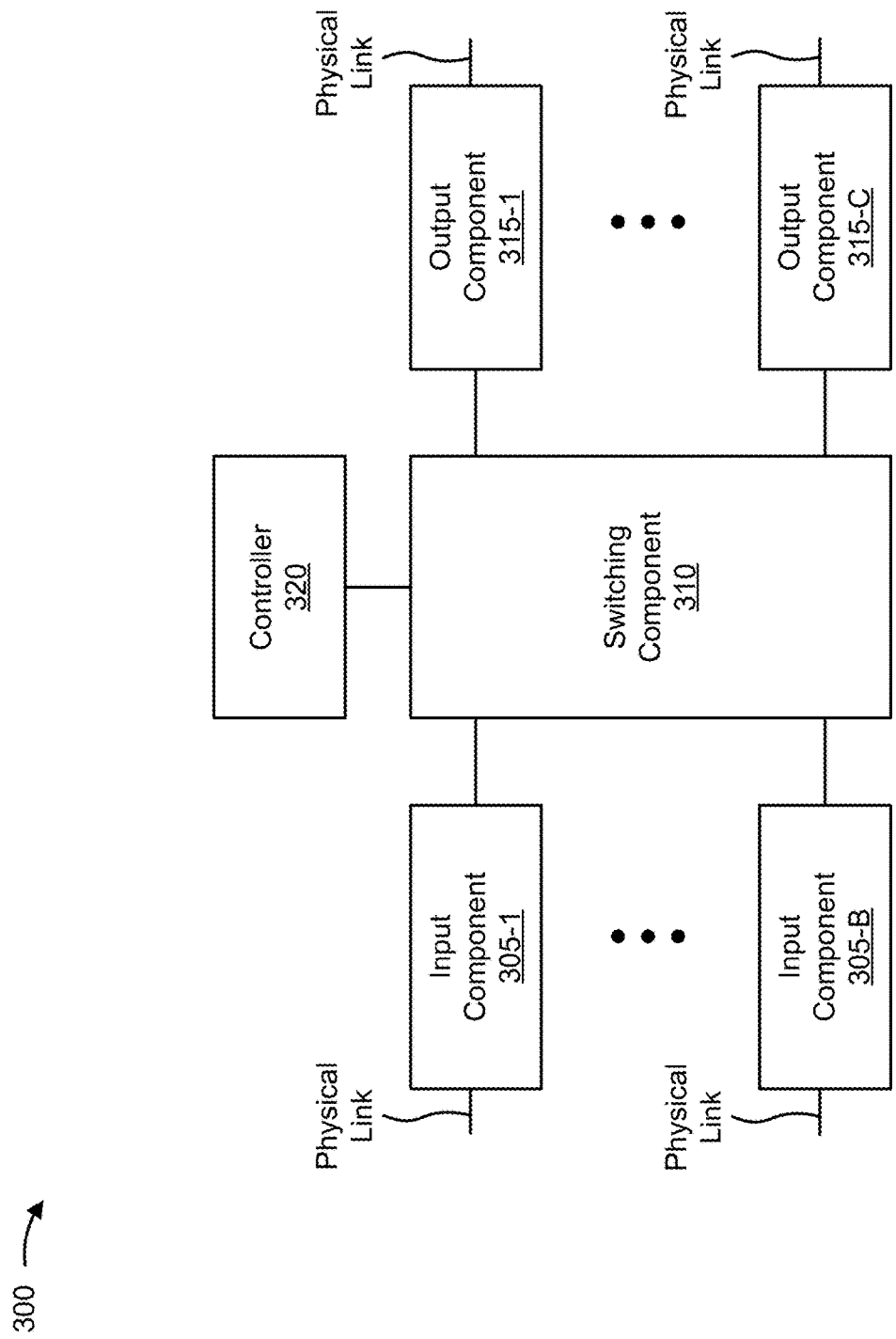
FIG. 3 is a diagram of example components of one or more devices of FIG. 2.

FIG. 3 is a diagram of example components of a device 300. Device 300 may correspond to client device 210, network device 220, and/or administrator device 250. In some implementations, client device 210, network device 220, and/or administrator device 250 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor that can interpret and/or execute instructions. A processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, or an optical memory) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
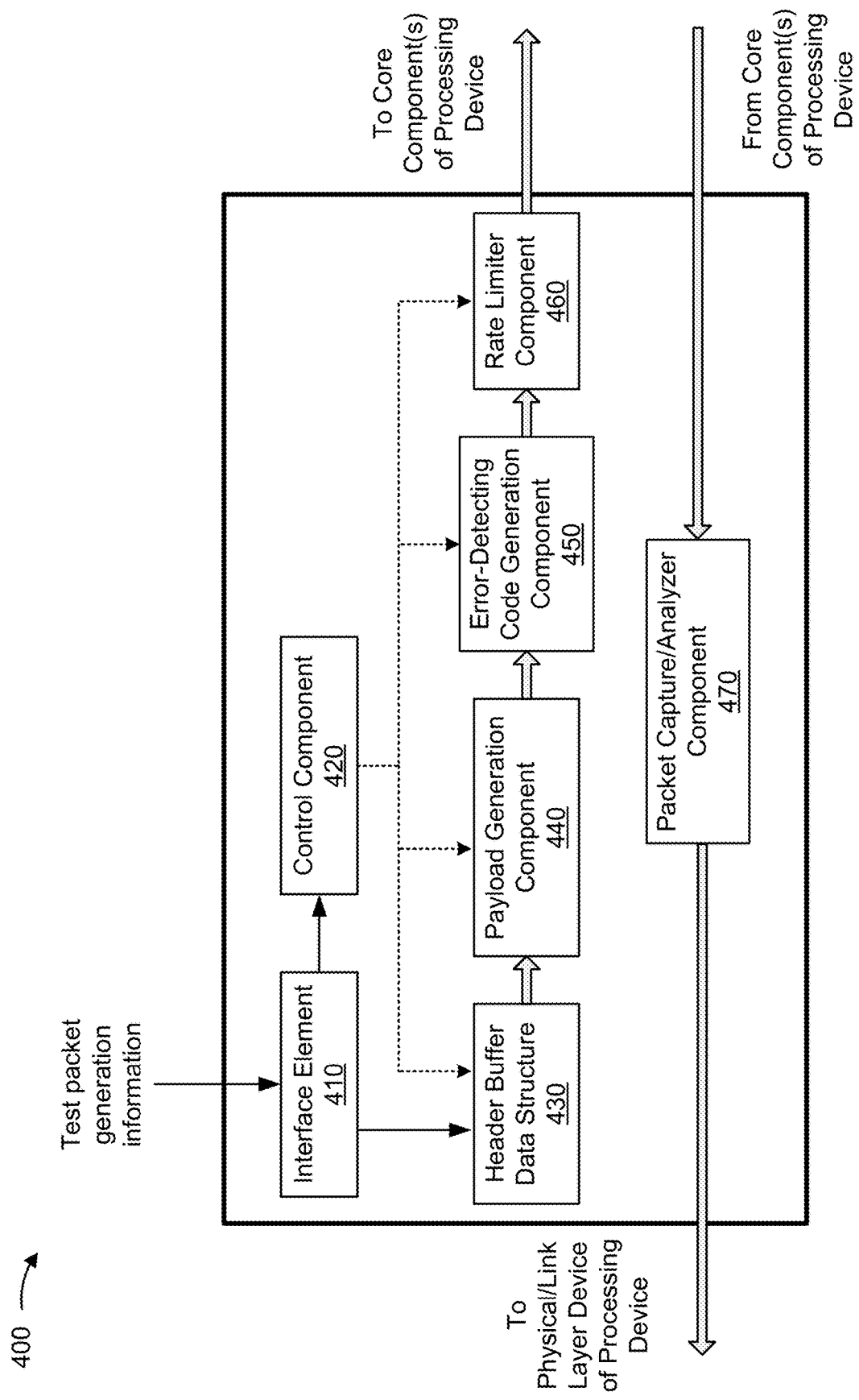
FIG. 4 is a diagram of an example packet generator device described herein.

FIG. 4 is a schematic block diagram of an example packet generator device 400. As shown in FIG. 4, packet generator device 400 may include an interface element 410, a control component 420, a header buffer data structure 430, a payload generation component 440, an error-detecting code generation component 450, a rate limiter component 460, and a packet capture/analyzer component 470. The element(s) and component(s) of packet generator device 400 may be implemented in hardware (e.g., the element(s) and component(s) may include one or more logic circuits and/or the like), firmware, or a combination of hardware and software.

In some implementations, packet generator device 400 may be incorporated in (e.g., built into) a packet processing device (e.g., an ASIC) of a packet forwarding component, which may be communicatively coupled (e.g., installed in or plugged into) an I/O component (e.g., I/O component 305/315, which may include a line card). In some implementations, interface element 410 may be communicatively coupled to an interface component (e.g., a programmable input/output component) of the packet processing device.

In some implementations, the interface component may be communicatively coupled (e.g., via a PCIe bus) to a control device (e.g., one or more processors implemented as one or more ASICs) of the I/O component (e.g., I/O component 305/315). In some implementations, the control device may include one or more drivers that can control the packet processing device, and an application module (e.g., an embedded software module) that can control the driver(s).

In some implementations, a packet generator element (e.g., a software-based tool or toolkit) may be provided and utilized to control the application module and/or the driver(s). In some implementations, the packet generator element may be included in a controller of a network device (e.g., a controller 320 of network device 220). An example implementation is shown in FIG. 7A, and described in more detail below. Additionally, or alternatively, the packet generator element may be included in the control device of the I/O component. An example implementation is shown in FIG. 7B, and described in more detail below. Additionally, or alternatively, the packet generator element may be included in an external device (e.g., a management device) located remotely from network device 220. An example implementation is shown in FIG. 7C, and described in more detail below.

In some implementations, a device (e.g., administrator device 250) may provide a user interface, such as a command line interface, that permits a user (e.g., a system or network administrator) to input test packet generation information. In some implementations, the user interface may communicate (e.g., via an operating system environment provided in, or executed by, controller 320 of network device 220) the test packet generation information to the packet generator element. Additionally, or alternatively, the packet generator element may be pre-configured (e.g., pre-programmed) with one or more sets of test packet generation information.

In some implementations, the packet generator element may cause the application module to control the driver(s) to provide the test packet generation information to interface element 410 of packet generator device 400.

In some implementations, the test packet generation information may include one or more parameters relating to the test packets that are to be generated, as described elsewhere herein (e.g., with respect to FIGS. 1A and 1B). For example, the test packet generation information may include information regarding a quantity of test packets that are to be generated by packet generator device 400, information regarding a rate at which the test packets are to be generated and/or provided (e.g., an output rate) by packet generator device 400, header data (e.g., layer 2 header data, such as Ethernet header data (e.g., MAC address information, etc.) and/or layer 3 header data, such as IP header data (e.g., IP address information, TTL information, etc.)) to be included in a header portion of each test packet generated by packet generator device 400, information regarding one or more data patterns that are to be included in payload data of each test packet (e.g., information indicating that the payload data is to be random, information indicating that the payload data is to include all 1's or all 0's, or information indicating that the payload data is to include one or more other data patterns) generated by packet generator device 400, and/or the like.

Header buffer data structure 430 may be included or stored in one or more memories of packet generator device 400. In some implementations, header buffer data structure 430 may be implemented as an index, a table, a linked list, a database, and/or the like.

In some implementations, in a case where the test packet generation information, received by interface element 410, includes header data, header buffer data structure 430 may store the header data. In some implementations, header buffer data structure 430 may provide the header data for inclusion in a header portion (e.g., as head bytes) of one or more test packets generated by packet generator device 400.

In some implementations, and in a case where the test packet generation information, received by interface element 410, includes information regarding a data pattern that is to be included in payload data of each test packet, payload generation component 440 may generate, for each test packet, payload data based on the data pattern. In some implementations, in a case where the test packet generation information, received by interface element 410, includes header data, and where header buffer data structure 430 stores the header data, payload generation component 440 may obtain the header data from header buffer data structure 430, and append the header data to the generated payload data.

In some implementations, error-detecting code generation component 450 may generate, and append, to an output of payload generation component 440 (e.g., the header data and the payload data), a trailer portion that includes one or more error-detecting codes. For example, error-detecting code generation component 450 may include a cyclic redundancy check generation component (e.g., that includes logic circuitry and/or the like) that is configured to calculate, based on the output of payload generation component 440, a check value, and append the check value (e.g., as a 4-byte value), to the output of payload generation component 440, to provide a generated test packet (e.g., a complete test packet).

Rate limiter component 460 may control a rate of output of test packets provided by packet generator device 400. In some implementations, rate limiter component 460 may include one or more buffers (e.g., queue(s) and/or the like) that can receive generated test packets from error-detecting code generation component 450. In some implementations, and in a case where the test packet generation information, received at interface element 410, includes information regarding an output rate relating to the test packets, rate limiter component 460 may provide the generated test packets (e.g., to core component(s) of a packet processing device, as described in more detail below with respect to FIG. 5) based on the output rate. For example, rate limiter component 460 may provide the generated test packets at the output rate. In this way, packet generator device 400 provides precise rate control of generated test packets to enable output of the generated test packets at any line rate that may be supported by a network component or device, such as I/O component 305/315 and/or network device 220.

As shown in FIG. 4, control component 420 may control the operation of various components of packet generator device 400. For example, control component 420 may control header buffer data structure 430, payload generation component 440, error-detecting code generation component 450, and/or rate limiter component 460.

In some implementations, control component 420 may be implemented as a control state machine (e.g., a finite state machine) that can receive one or more control inputs from interface element 410, and control the various components of packet generator device 400 based on the control inputs.

In some implementations, interface element 410 may provide, to control component 420, a portion, or an entirety, of the test packet generation information received from the interface component of the packet processing device, as control input(s). For example, in a case where the test packet generation information, received by interface element 410, includes information regarding an output rate relating to the test packets, interface element 410 may provide the information regarding the output rate to control component 420 as a control input. Additionally, or alternatively, and as another example, in a case where the test packet generation information, received by interface element 410, includes information regarding a data pattern to be included in payload data for each test packet, interface element 410 may provide the information regarding the data pattern to control component 420 as a control input. Additionally, or alternatively, and as yet another example, in a case where the test packet generation information, received by interface element 410, includes information regarding a quantity of test packets that are to be generated and/or provided, interface element 410 may provide the information, regarding the quantity of test packets that are to be generated and/or provided, to control component 420 as a control input.

In some implementations, and in a case where the test packet generation information is provided by a user via a user interface (e.g., provided by administrator device 250), control component 420 may provide (e.g., via interface element 410) status information regarding the packet generation process, at packet generator device 400, to the user interface. In some implementations, control component 420 may provide the status information after the packet generation process has been completed (e.g., after a quantity of test packets, corresponding to a quantity of test packets that are to be generated, has been generated and/or provided). Additionally, or alternatively, control component 420 may provide the status information during the packet generation process.

As shown in FIG. 4, packet capture/analyzer component 470 may receive packets from the core component(s) of the packet processing device, and may provide the received packets to a physical/link layer device of the packet processing device. In some implementations, packet capture/analyzer component 470 may determine statistics on the received packets, such as a quantity of packets received and/or the like. Alternatively, packet capture/analyzer component 470 may not determine any statistics on received packets, and may simply function as a pass-through for the received packets.

In some implementations, packet generator device 400 may include an ingress portion and an egress portion. In this case, packet capture/analyzer component 470 may be included in the egress portion, and other element(s) and/or component(s) of packet generator device 400 (e.g., interface element 410, control component 420, header buffer data structure 430, payload generation component 440, error-detecting code generation component 450, rate limiter component 460, and/or the like) may be included in the ingress portion.

Although not shown, packet generator device 400 may include one or more clock signals, reset signals, and/or the like that can be provided to one or more of the element(s) and/or component(s) of packet generator device 400 (e.g., control component 420, payload generation component 440, and/or the like) that can support and/or facilitate the operation of the element(s) and/or component(s) (e.g., during test packet generation).

The number and arrangement of components shown in FIG. 4 are provided as an example. In practice, packet generator device 400 may include additional components, fewer components, different components, or differently arranged components than those shown in FIG. 4. For example, although FIG. 4 shows a single interface element 410, a single control component 420, a single header buffer data structure 430, a single payload generation component 440, a single error-detecting code generation component 450, a single rate limiter component 460, and a single packet capture/analyzer component 470, in some implementations, packet generator device 400 may include multiple sets of such elements and/or components. In this way, packet generator device 400 can be capable of generating multiple streams of test packets, in parallel, which permits testing of additional capacity and/or bandwidth of various network device components.

Additionally, or alternatively, a set of components (e.g., one or more components) of packet generator device 400 may perform one or more functions described as being performed by another set of components of packet generator device 400.

Although some implementations are described herein with respect to Ethernet technology, the implementations described herein apply equally, or similarly, to other media access formats and/or computer networking technologies.

Figure 5:
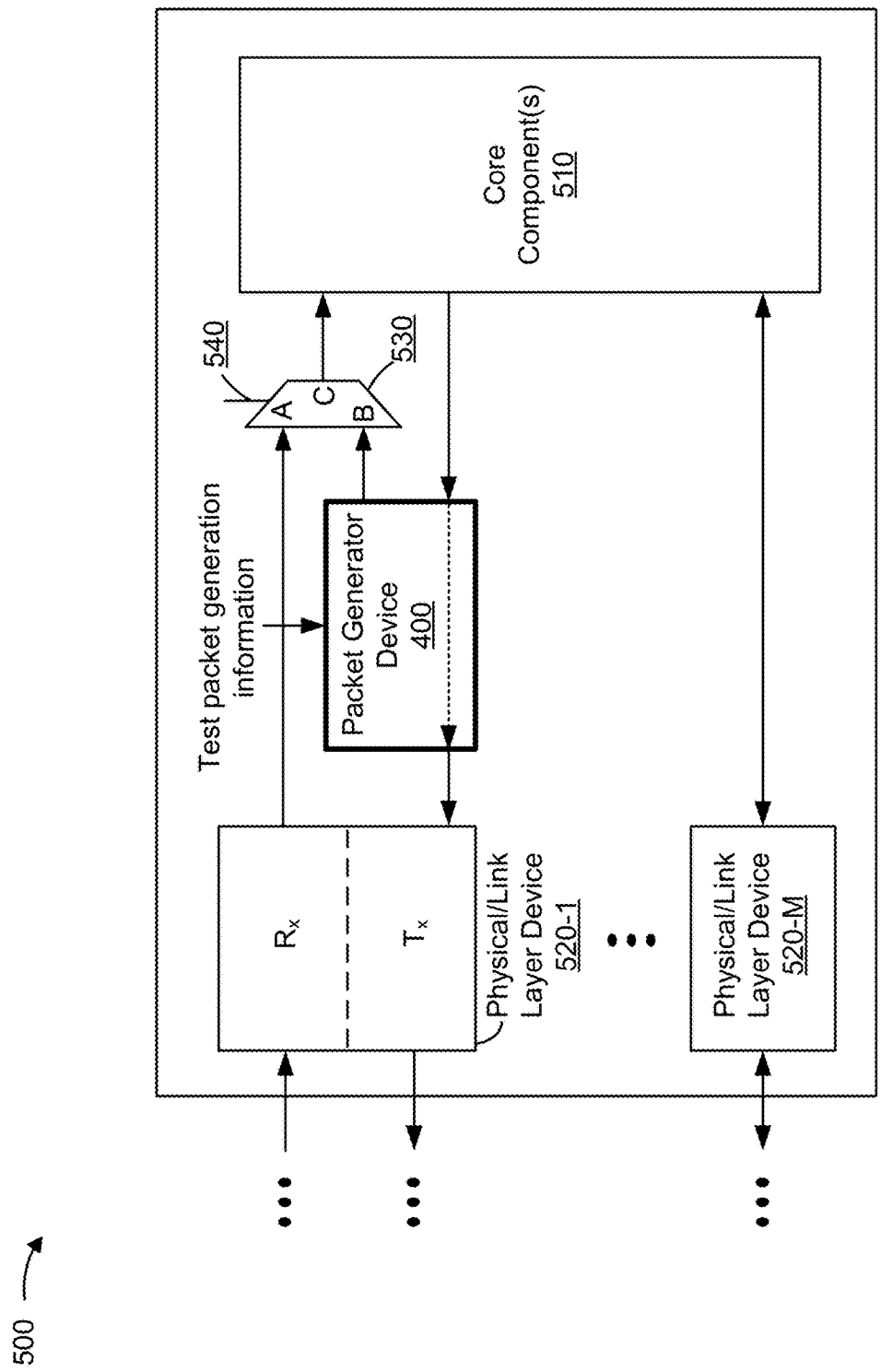
FIG. 5 is a diagram of an example packet processing device in which the packet generator device of FIG. 4 may be incorporated.

FIG. 5 is a schematic block diagram of an example packet processing device 500. In some implementations, packet processing device 500 may be implemented as one or more ASICs. In some implementations, packet processing device 500 may be implemented as an Ethernet-based device or as a device based on another computer networking technology. As shown in FIG. 5, packet processing device 500 may include core component(s) 510, one or more physical/link layer devices 520-1 through 520-M (M≥1) (hereinafter referred to collectively as "physical/link layer devices 520,"

and individually as "physical/link layer device 520"), a signal selection device 530, and packet generator device 400.

In some implementations, core component(s) 510 may include one or more processors, one or more memories, and/or the like that can process and/or forward packets. Although not shown, in some implementations, core component(s) 510 may be communicatively coupled to a switching component (e.g., fabric interconnect(s)) of a network device (e.g., switching component 310 of network device 220), which permits testing of core component(s) 510 up to the full capacity of core component(s) 510, and permits the use of packet generator device 400 to test one or more other packet forwarding components of the network device (e.g., interfaces, such as wide area network egress interfaces, of other packet forwarding component(s)), thereby enabling testing of end-to-end traffic flow. An example of end-to-end traffic flow is the use of packet generator device 400, e.g., included in an input component of network device 220, such as any one of input components 305-1 to 305-B, to generate test packets for testing one or more physical links associated with an output component of network device 220, such as any one of output components 315-1 to 315-C. In this case, the generated test packets can pass through a switching component of network device 220, such as switching component 310, and egress from the output component (e.g., from one or more of output components 315-1 to 315-C) to the associated physical link(s).

In some implementations, and in a case where packet processing device 500 is implemented as an Ethernet-based device, physical/link layer device 520 may include an Ethernet MAC device, an Ethernet PCS device, and/or a combination of these or other types of devices. As shown in FIG. 5, physical/link layer device 520 may include a receiver portion Rx that can receive packets from one or more devices (e.g., client devices 210 and/or other devices, such as devices communicatively coupled to network 240), and a transmitter portion Tx that can transmit packets to one or more devices (e.g., client devices 210 and/or other devices, such as devices communicatively coupled to network 240).

Signal selection device 530 may selectively provide packets to core component(s) 510. In some implementations, signal selection device 530 may include a multiplexer that is implemented in hardware, firmware, or a combination of hardware and software. As shown in FIG. 5, signal selection device 530 may include a select line 540, a data input A that can receive packets from receiver portion Rx, a data input B that can receive test packets from packet generator device 400, and an output C that can output packets, received at either input A or input B, to core component(s) 510. In some implementations, output C may output packets, received at either input A or input B, to core component(s) 510, depending on a value of a control signal provided to select line 540.

In some implementations, a value of the control signal may be based on the test packet generation information (e.g., test packet generation information provided by a user via a user interface, such as a command line interface) and/or an associated command (e.g., one or more command(s) provided by a packet generator element, such as the packet generator element (e.g., the software-based tool or toolkit) included in a control device of an I/O component (e.g., a control device of I/O component 305/315), as described above with respect to FIG. 4). In some implementations, the control signal may be provided by one or more drivers, included in and/or accessible to the control device of the I/O component, and/or by one or more components of the I/O component that are controlled by the one or more drivers.

In some implementations, and in a case where a value of a control signal provided to select line 540 causes input A to become communicatively coupled to output C (e.g., the value of the control signal may be a logic '1' or '0,' depending on the configuration of signal selection device 530), signal selection device 530 may provide incoming packets, received by receiver portion Rx of physical/link layer device 520-1, to core component(s) 510. In some implementations, and in a case where the value of the control signal provided to select line 540 causes input B to become communicatively coupled to output C (e.g., the value may be a logic '1' or '0,' depending on the configuration of signal selection device 530), signal selection device 530 may provide test packets, generated and/or provided by packet generator device 400, to core component(s) 510.

In this way, where a packet forwarding component, or a packet processing device (e.g., packet processing device 500) of a packet forwarding component, includes multiple physical/link layer devices (e.g., physical/link layer devices 520), an input, of core component(s) of the packet processing device (e.g., core component(s) 510), that would otherwise be coupled to a receiver portion of one of the physical/link layer devices (e.g., receiver portion Rx of physical/link layer device 520-1), can be utilized to instead receive generated test packets from packet generator device 400. This reduces or eliminates a need to utilize external test equipment (e.g., to test the packet forwarding component, to test one or more other packet forwarding components, and/or the like), which may otherwise need to be externally connected to a port that leads to the receiver portion of the physical/link layer device (e.g., receiver portion Rx of physical/link layer device 520-1). In some implementations, external test equipment may be used, in conjunction with packet generator device 400, to generate and provide test packets to packet processing device 500 (e.g., by coupling the external test equipment to a port that leads to the receiver portion of another physical/link layer device 520).

The number and arrangement of components shown in FIG. 5 are provided as an example. In practice, packet processing device 500 may include additional components, fewer components, different components, or differently arranged components than those shown in FIG. 5. Additionally, or alternatively, a set of components (e.g., one or more components) of packet processing device 500 may perform one or more functions described as being performed by another set of components of packet processing device 500.

Figure 6:
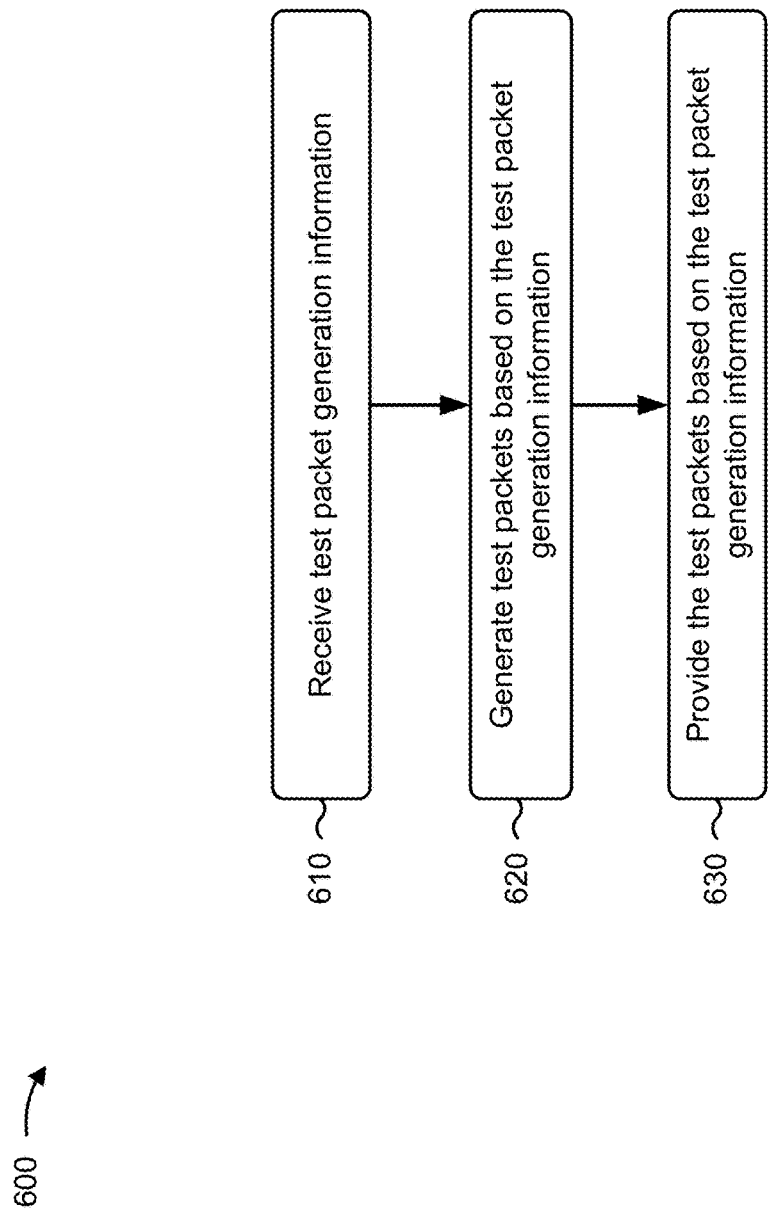
FIG. 6 is a flow chart of an example process for generating test packets.

FIG. 6 is a flow chart of an example process 600 for generating test packets. In some implementations, one or more process blocks of FIG. 6 may be performed by packet generator device 400. In some implementations, one or more process blocks of FIG. 6 may be performed by another device or a group of devices separate from or including packet generator device 400, such as one or more other components of packet processing device 500.

As shown in FIG. 6, process 600 may include receiving test packet generation information (block 610). For example, packet generator device 400 may receive (e.g., using interface element 410 and/or the like) test packet generation information. In some implementations, packet generator device 400 may receive test packet generation information based on an input from a user of a device (e.g., via a user interface provided by administrator device 250, client device 210, and/or the like), as described above with respect to FIGS. 4 and 5.

In some implementations, the test packet generation information may include information regarding a quantity of test packets that are to be generated by packet generator device 400, information regarding a rate at which the test packets are to be generated and/or provided by packet generator device 400 (e.g., an output rate), header data that is to be included in each test packet, information regarding one or more data patterns that are to be included in payload data of each test packet generated by packet generator device 400, and/or the like, as described above with respect to FIGS. 1A, 1B, and 4.

In this way, packet generator device 400 may receive test packet generation information to cause packet generator device 400 to generate test packets based on the test packet generation information.

As shown in FIG. 6, process 600 may include generating test packets based on the test packet generation information (block 620). For example, packet generator device 400 may generate (e.g., using control component 420, header buffer data structure 430, payload generation component 440, error-detecting code generation component 450, and/or the like) test packets based on the test packet generation information.

In some implementations, and as described above with respect to FIG. 4, control component 420 may control header buffer data structure 430, payload generation component 440, and/or error-detecting code generation component 450 to generate test packets based on the test packet generation information. For example, to generate each test packet, control component 420 may cause payload generation component 440 to generate payload data (e.g., based on information regarding data pattern(s) included in the test packet generation information), cause header buffer data structure 430 to provide header data (e.g., based on header data included in the test packet generation information) to payload generation component 440, cause payload generation component 440 to append the header data to the payload data, and cause payload generation component 440 to provide the payload data and the appended header data to error-detecting code generation component 450 to append a trailer portion to the payload data, as described above with respect to FIG. 4. Continuing the example, in a case where the test packet generation information includes information regarding a quantity of test packets that are to be generated, control component 420 may control header buffer data structure 430, payload generation component 440, and/or error-detecting code generation component 450 to generate a quantity of test packets that corresponds to the quantity of test packets that are to be generated, as described above with respect to FIG. 4.

In this way, packet generator device 400 may generate test packets based on the test packet generation information to cause packet generator device 400 to provide the test packets based on the test packet generation information.

As shown in FIG. 6, process 600 may include providing the test packets based on the test packet generation information (block 630). For example, packet generator device 400 may provide (e.g., using control component 420, rate limiter component 460, and/or the like) the test packets based on the test packet generation information.

In some implementations, and as described above with respect to FIG. 4, control component 420 may cause rate limiter component 460 to provide generated test packets for output. For example, in a case where the test packet generation information includes information regarding an output rate relating to the test packets, control component 420 may control rate limiter component 460 to output the generated test packets, received from payload generation component 440 and/or error-detecting code generation component 450, at the output rate, as described above with respect to FIG. 4.

In this way, packet generator device 400 may provide the test packets based on the test packet generation information.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7C are diagrams of example implementations 700, 720, and 740, respectively, relating to packet generator device 400 and packet processing device 500.

Example implementation 700, as shown in FIG. 7A, may include a network device 220. As shown, network device 220 may include multiple I/O components (e.g., line cards), including an I/O component 305/315 and an I/O component 305n/315n, which may be the same as, or similar to, I/O component 305/315.

As shown in FIG. 7A, I/O component 305/315 may include a packet processing device 500 (e.g., implemented as an ASIC and included in a packet forwarding component installed in I/O component 305/315) and a control device 702 (e.g., implemented as an ASIC). As shown, packet processing device 500 may include a packet generator device 400 and an interface component 704 (e.g., a programmable input/output component, as described above with respect to FIG. 4). As shown, control device 702 may include an application module 708 and driver(s) 710 (e.g., the application module and driver(s) described above with respect to FIG. 4).

As shown in FIG. 7A, I/O component 305n/315n may include a control device 702n (which may be the same as, or similar to, control device 702) and a packet processing device 500n (which may be the same as, or similar to, packet processing device 500). As shown, packet processing device 500n may include an interface component 704n (which may be the same as, or similar to, interface component 704) and a packet generator device 400n (which may be the same as, or similar to, packet generator device 400). As shown, control device 702n may include an application module 708n (which may be the same as, or similar to, application module 708) and driver(s) 710n (which may be the same as, or similar to, driver(s) 710).

As shown in FIG. 7A, a controller 320 of network device 220 may include a packet generator element 706 (e.g., the packet generator element described above with respect to FIG. 4), which may be communicatively coupled to application module 708 and/or application module 708n. Although not shown, example implementation 700 may include one or more additional I/O components that may be the same as, or similar to, I/O component 305/315 and/or I/O component 305n/315n. In such a case, packet generator element 706 may additionally, or alternatively, be communicatively coupled to one or more application modules of such additional I/O components.

In some implementations, packet generator element 706 may receive test packet generation information (e.g., from a command line interface, as described above with respect to FIG. 4), and cause (e.g., via one or more application function calls) application module 708 to control driver(s) 710 to provide the test packet generation information to interface component 704, and ultimately to packet generator device 400. Additionally, or alternatively, packet generator element 706 may cause (e.g., via one or more application function calls) application module 708n to control driver(s) 710n to provide the test packet generation information to interface component 704*n*, and ultimately to packet generator device 400*n*.

In some implementations, and in a case where the test packet generation information is provided from a user interface (e.g., a command line interface), the user interface may permit a user to configure and/or provide one or more sets of test packet generation information to one or more packet generator devices (e.g., where multiple sets of test packet generation information are provided, the sets may be the same, similar, or different). For example, a user may direct a set of test packet generation information to packet generator device 400 and/or a set of test packet generation information to packet generator device 400*n*. In this way, one or more sets of test packet generation information may be directed to one or more packet generator devices, which can permit the generation of one or more streams, or flows, of test packets across one or more packet processing devices, one or more I/O components, and/or one or more other components of a network device (e.g., a switching component 310 of network device 220).

In some implementations, network device 220 and/or one or more components of network device 220 may be configured to recirculate (e.g., "snake") and forward and/or route one or more test packets generated by a packet generator device (e.g., packet generator device 400, packet generator device 400*n*, and/or the like) throughout a portion, or an entirety, of network device 220. Additionally, or alternatively, network device 220 and/or one or more components of network device 220 may be configured with one or more test packet header modification functions (e.g., implemented in hardware, firmware, or a combination of hardware and software) that can modify (e.g., periodically, continuously, and/or the like) header data of one or more generated test packets (e.g., by altering destination information (e.g., a destination IP address) included in the header data). This permits the creation of additional (e.g., a large quantity of) traffic streams, or flows, of packets for testing some or all of the components of network device 220 (e.g., at full capacity or bandwidth of network device 220 and/or components of network device 220).

In some implementations, packet generator element 706 may be pre-configured (e.g., pre-programmed) to provide, during initialization (e.g., during a power-on-self-test (POST)), of I/O component 305/315, I/O component 305*n*/315*n*, one or more other like I/O components of network device 220, and/or one or more other components of network device 220 (e.g., a switching component 310), one or more sets of test packet generation information to application module 708, application module 708*n*, and/or one or more other application modules included in other I/O components to cause corresponding packet generator device(s) to generate and provide test packets across network device 220. In this way, a portion, or an entirety, of network device 220 may be automatically tested, during startup, to identify any system issues that may need to be addressed.

In some implementations, packet generator element 706 may be included in controller 320 without affecting (e.g., without restricting) any configurations, features, and/or services provided by controller 320, such as, for example, configurations, features, and/or services set via a command line interface.

Example implementation 720, as shown in FIG. 7B, may include an I/O component 305/315 that includes the same (or similar) components, elements, devices, and/or the like as I/O component 305/315 of example implementation 700 shown in FIG. 7A. Here, in example implementation 720, I/O component 305/315 may not be included in a network device (e.g., may not be installed in, or plugged into, a chassis of a network device), such as network device 220. Rather, as shown in FIG. 7B, I/O component 305/315 may include a packet generator element 706 (e.g., in control device 702), which may provide test packet generation information to application module 708, without a need for I/O component 305/315 to be communicatively coupled to a controller of a network device (e.g., controller 320 of network device 220 of example implementation 700 shown in FIG. 7A).

In some implementations, packet generator element 706 and/or another component or element of control device 702 may include functionality that permits a user to input test packet generation information. For example, packet generator element 706 and/or another component or element of control device 702 may provide command line interface functionality similar to functionality that may be provided by a command line interface that communicates with controller 320 of example implementation 700. Additionally, or alternatively, and in some implementations, packet generator element 706 and/or another component or element of control device 702 may include packet forwarding functionality that permits appropriate forwarding of test packets generated by packet generator device 400. For example, packet generator element 706 and/or another component or element of control device 702 may provide routing and/or switching functionality similar to routing and/or switching functionality that may be provided by controller 320 (and/or a switching component) of example implementation 700 shown in FIG. 7A.

In this way, even in a case where I/O component 305/315 is operating as a standalone component (e.g., as shown in FIG. 7B), such as during development or testing (e.g., on a bench and/or during board start-up or "bring-up"), packet generator device 400 may be utilized to generate and provide test packets for testing I/O component 305/315 and/or one or more components of I/O component 305/315.

Example implementation 740, as shown in FIG. 7C, may include a network device 220 that may be the same as (or similar to) network device 220 of example implementation 700 shown in FIG. 7A, with a difference being that packet generator element 706 of example implementation 740 may be included in a management device 742 (e.g., administrator device 250 or another device). Although not shown, in some implementations, management device 742 may be communicatively coupled to network device 220 over a network (e.g., over customer network 230 or network 240).

Here, in example implementation 740, management device 742 may provide a user interface (e.g., a command line interface) that may be the same as, or similar to, a user interface that communicates with controller 320 of example implementation 700. This permits a user (e.g., a system or network administrator) of management device 742 to input test packet generation information. As shown in FIG. 7C, packet generator element 706 may provide test packet generation information to application module 708 and/or application module 708*n* via controller 320. In some implementations, packet generator element 706 may be configured to cause controller 320 (e.g., via one or more functional calls) to provide the test packet generation information to application module 708 and/or application module 708*n* (e.g., to ultimately be provided to packet generator device 400 and/or packet generator device 400*n*).

In this way, a user (e.g., a system or network administrator) can remotely control the generation of test packets at a network device, which provides more flexibility in testing the network device.

As indicated above, FIGS. 7A-7C are provided merely as examples. Other examples are possible and may differ from what was described with regard to FIGS. 7A-7C.

Some implementations, described herein, provide hardware (e.g., an ASIC) of a packet forwarding component that includes a packet generator device that is capable of generating test packets for testing the packet forwarding component, one or more other packet forwarding components, and/or one or more other components of a network device to which the packet forwarding component may be communicatively coupled. In some implementations, the packet generator device is capable of generating test packets based on test packet generation information provided from a user interface (e.g., a command line interface) communicatively coupled to the device.

In this way, an input and/or output component (e.g., a line card) and/or a packet processing and/or forwarding component coupled to the input and/or output component is self-equipped with a packet generator device that generates test packets, which reduces or eliminates a need for external test equipment for network device testing purposes, thereby reducing the costs associated with testing a network device and/or components of the network device. In addition, this permits customization of test packets (e.g., by including or injecting intentional errors in the test packets), which permits the design of unit test cases to test and/or diagnose error handling in software and hardware components during system development, device manufacturing, and in-field debugging, which speeds up development and manufacturing cycles and debug sessions. Furthermore, the capability to customize test packets permits testing of various (e.g., all) media types supported by a network device, which reduces or eliminates a need to develop and/or procure new test equipment, as newer networking technologies are incorporated into network device components, such as line cards and packet forwarding components.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
   at least one core component of an input/output component; and
   a packet generator device, of the input/output component, implemented in hardware, the packet generator device including:
   an ingress portion including:
   a control component,
   a payload generation component,
   an interface element to receive test packet generation information from a device external to the network device,
   the test packet generation information including:
   one or more control inputs,
   header data that is to be included in test packets for testing the network device,
   information regarding a data pattern that is to be included in payload data of the test packets, and
   information regarding a rate at which the test packets are to be provided,
   where the one or more control inputs, when provided to the control component, cause the control component to control the payload generation component to generate the test packets based on the header data and the information regarding the data pattern,
   where the control component is configured with a test packet header modification function that periodically or continuously modifies the header data by altering destination information included in the header data, and a rate limiter component to control a rate of output of the test packets to the at least one core component based on the information regarding the rate at which the test packets are to be provided to the at least one core component for testing the network device, of which the rate limiter component is included,
where the ingress portion provides the test packets generated by the packet generator device to the at least one core component; and
an egress portion including:
a packet capture/analyzer component to receive packets from the at least one core component, analyze the packets, and provide the packets to a physical/link layer device of the network device.

2. The network device of claim 1, where the packet generator device further includes a header buffer data structure to store the header data.

3. The network device of claim 1, where the one or more control inputs further include information regarding a quantity of test packets that are to be generated.

4. The network device of claim 3, where the one or more control inputs, when provided to the control component, further cause the control component to control the payload generation component to generate the test packets based on the information regarding the quantity of test packets that is to be generated.

5. The network device of claim 1, where the control component is implemented as a state machine.

6. The network device of claim 1, where the packet generator device is implemented in an application-specific integrated circuit (ASIC).

7. The network device of claim 1, where the packet generator device includes an error-detecting code generation component to generate and append one or more error-detecting codes to the test packets output by payload generation component.

8. A packet processing device, comprising:
a packet generator device, of an input/output component, implemented at least partially in hardware,
the packet generator device including:
an ingress portion including:
a control component,
a payload generation component,
an interface element to receive packet generation information from a device external to the packet processing device,
the packet generation information including:
one or more control inputs,
header data that is to be included in test packets for testing a network device,
information regarding a data pattern, and
information regarding a rate at which the test packets are to be provided,
where the one or more control inputs, when provided to the control component, cause the control component to control the payload generation component to generate the test packets based on the header data and/or the information regarding the data pattern, and
where the control component is configured with a test packet header modification function that periodically or continuously modifies the header data by altering destination information included in the header data, and
a rate limiter component to control a rate of output of the test packets to at least one core component of the network device based on the information regarding the rate at which the test packets are to be provided to at least one core component of the input/output component for testing the network device,
where the ingress portion provides the test packets generated by the packet generator device to the at least one core component; and
an egress portion including:
a packet capture/analyzer component to receive packets from the at least one core component, analyze the packets, and provide the packets to a physical/link layer device of the packet processing device.

9. The packet processing device of claim 8, where the packet processing device is incorporated in a packet forwarding component of the network device.

10. The packet processing device of claim 8, further comprising:
a plurality of physical/link layer devices including the physical/link layer device; and
a signal selection device that includes a first input, a second input, and an output.

11. The packet processing device of claim 10, where the first input is communicatively coupled to a first physical/link layer device of the plurality of physical/link layer devices, where the second input is communicatively coupled to the packet generator device, and where the output is communicatively coupled to the at least one core component.

12. The packet processing device of claim 11, where the signal selection device further includes a select line, and where the signal selection device communicatively couples the at least one core component and the packet generator device or the at least one core component and the first physical/link layer device based on a value of a control signal provided to the select line.

13. The packet processing device of claim 10, where the signal selection device includes a multiplexer.

14. The packet processing device of claim 10, where the plurality of physical/link layer devices includes one or more Ethernet media access control (MAC) devices and/or one or more physical coding sublayer (PCS) devices.

15. A method, comprising:
receiving, by an interface element of an ingress portion of a packet generator device included in an input/output component of a network device, test packet generation information from a device external to the network device,
the packet generator device being incorporated in a packet forwarding component of the network device and including:
a control component included in the ingress portion, and
a payload generation component included in the ingress portion, the test packet generation information including:
one or more control inputs,
header data that is to be included in test packets for testing the network device,
information regarding a data pattern, and
information regarding a rate at which the test packets are to be provided;
obtaining, by the control component of the ingress portion and from the interface element, the one or more control inputs;
causing, by the control component and based on the one or more control inputs, the payload generation component to generate of the test packets based on the header data or the information regarding the data pattern,
where causing the test packets to be generated includes using a test packet header modification function that periodically or continuously modifies the header data by altering destination information included in the header data;
controlling, by a rate limiter component included in the ingress portion, a rate of output of the test packets to at least one core component of the input/output component based on the information regarding the rate at which the test packets are to be provided to the at least one core component for testing the network device,
where the ingress portion provides the test packets generated by the packet generator device to the at least one core component;
receiving, by a packet/analyzer component of an egress portion of the packet generator device, packets from the at least one core component;
analyzing, by the packet/analyzer component, the packets; and
providing, by the packet/analyzer component, the packets to a physical/link layer device of the network device.

16. The method of claim 15, where the packet generator device further includes an error-detecting code generation component,
the method further comprising:
including, by the error-detecting code generation component, an error-detecting code in the test packets.

17. The method of claim 15, where the header data includes Ethernet header data and/or Internet Protocol (IP) header data.

18. The method of claim 15, where receiving the test packet generation information includes receiving the test packet generation information based on one or more command line interface commands.

19. The method of claim 15, where the interface element is communicatively coupled to a control device of a line card via a bus.

20. The method of claim 19, where the bus includes a peripheral component interconnect express (PCIe) bus.

* * * * *